United States Patent
Harazin et al.

(10) Patent No.: US 7,823,447 B2
(45) Date of Patent: Nov. 2, 2010

(54) METHOD AND APPARATUS FOR SENSING A LIQUID LEVEL

(75) Inventors: Richard Raymond Harazin, Lombard, IL (US); Ronald Alvin Zweifel, Naperville, IL (US)

(73) Assignee: PerkinElmer LAS, Inc., Waltham, MA (US)

( * ) Notice: Subject to any disclaimer, the term of this patent is extended or adjusted under 35 U.S.C. 154(b) by 584 days.

(21) Appl. No.: 11/856,394

(22) Filed: Sep. 17, 2007

(65) Prior Publication Data

US 2009/0071245 A1    Mar. 19, 2009

(51) Int. Cl.
    *G01F 23/00*    (2006.01)
(52) U.S. Cl. ..................................... 73/304 R
(58) Field of Classification Search ............... 73/304 R, 73/863.11, 864, 864.01
    See application file for complete search history.

(56) References Cited

U.S. PATENT DOCUMENTS

| | | | |
|---|---|---|---|
| 3,391,547 A | 7/1968 | Kingston | 62/218 |
| 4,328,065 A * | 5/1982 | Kincheloe et al. | 156/502 |
| 4,470,008 A | 9/1984 | Kato | 327/4 |
| 4,818,492 A | 4/1989 | Shimizu | 422/100 |
| 5,365,783 A | 11/1994 | Zweifel | 73/304 C |
| 5,437,184 A | 8/1995 | Shillady | 73/304 C |
| 6,107,810 A | 8/2000 | Ishizawa et al. | 324/662 |
| 6,389,548 B1 | 5/2002 | Bowles | 713/500 |
| 7,191,647 B2 | 3/2007 | Harazin et al. | 73/290 R |
| 2001/0047692 A1 | 12/2001 | Lipscomb et al. | 73/864.25 |
| 2005/0092080 A1 | 5/2005 | Harazin et al. | 73/290 R |
| 2006/0096396 A1 | 5/2006 | Harazin et al. | 73/866.5 |

FOREIGN PATENT DOCUMENTS

| | | |
|---|---|---|
| GB | 669227 | 4/1952 |
| GB | 1117409 | 6/1968 |
| WO | 0133828 A2 | 5/2001 |
| WO | 2006053086 A2 | 5/2006 |

OTHER PUBLICATIONS

International Search Report for PCT/US2008/074833 mailed Mar. 31, 2009.
Patent Abstracts of Japan, JP 62198771 A (Ando Electric Co., Ltd.), Sep. 2, 1987.
Patent Abstracts of Japan, JP 04218725 A (E I Du Pont De Nemours & Co.), Aug. 10, 1992.
Patent Abstracts of Japan, JP 08271556 A (A & T:KK), Oct. 18, 1996.

* cited by examiner

*Primary Examiner*—Hezron Williams
*Assistant Examiner*—Tamiko D Bellamy
(74) *Attorney, Agent, or Firm*—Lando & Anastasi, LLP

(57) ABSTRACT

Aspects of the invention are directed to methods and apparatus for dispensing liquids to and aspirating liquids from a container. In particular, one aspect is directed to a liquid level sensing system that includes a probe constructed and arranged to be moved relative to a liquid sample, a signal source coupled to the probe to apply an applied signal to the probe, at least one detector coupled to the probe to detect at least one detected signal, the detected signal being related to the applied signal and having a rising edge and a falling edge, and a controller coupled to the detector and configured to detect presence of a noise signal based on at least one of the rising edge and the falling edge of the detected signal.

25 Claims, 9 Drawing Sheets

METHOD AND APPARATUS FOR SENSING A LIQUID LEVEL

BACKGROUND OF INVENTION

1. Field of Invention

Embodiments of the invention relate generally to liquid level sensor systems and methods, and more specifically, to systems and methods for reducing effects of electrical noise in liquid level sensor systems.

2. Discussion of Related Art

Withdrawing and dispensing precise volumes of a liquid without contaminating the liquid is an important part of many clinical applications and laboratory tests. A number of automated or semi-automated liquid-measuring systems are presently being used to gauge more precisely the small liquid volumes that need to be withdrawn and/or dispensed.

Typical automated systems use a motor-controlled pipette-like probe to aspirate or dispense a desired amount of fluid from or into a container. The probe is movably mounted over the container and, using a precision-controlled motor, is vertically (z-axis) lowered into the container until the tip of the probe reaches a desired level below or above the upper surface of the liquid (the meniscus). A desired amount of liquid is then withdrawn from or dispensed into the container. Such systems have been designed to: minimize/reduce cross-contamination between the contents of different containers, avoid splashing of the liquid during the aspiration (or deposition) process, and minimize/reduce the portion of the probe that must be washed.

In many instances, the automated or semi-automated liquid-measuring system does not know beforehand the level of fluid contained within the container. Nonetheless, the pipette-like probe must typically be lowered to a certain position relative to the fluid level. Several systems control the position of the probe tip without previously knowing the upper level of the liquid in the container by sensing for the upper level of the liquid in the container as the probe is being lowered. For example, a measurement can be made of some electrical phenomena associated with a change in the capacitance between the probe and the liquid in the container as the tip of the probe approaches the liquid. This measurement may identify a liquid sense event (for example, penetrating the meniscus or withdrawing from the meniscus) when the capacitance between the probe and the liquid reflects a change that is greater than a threshold reference level.

A known system and technique for capacitive-based sensing of liquid level in a z-axis controlled liquid-measuring system is described in U.S. Pat. No. 5,365,783, to Ronald A. Zweifel (the "Zweifel system"), the disclosure of which is hereby incorporated by reference. U.S. Pat. No. 3,391,547 also describes capacitive liquid level systems and methods.

In some existing systems, labware used in liquid measuring and dispensing systems can collect and store static electricity. As the probe is moved closer and closer to the container, one or more static discharge events may occur between the probe and container during probe movement. These static discharge events can cause an instantaneous change in a signal indicative of the measured capacitance which can incorrectly be detected by the system as a liquid event (for example, a false positive indication that the probe is in the liquid when in fact the probe is still positioned above the liquid). Second, laboratories employing these systems typically have fluorescent light fixtures. The electronic ballasts used by these fixtures emit high frequency electromagnetic radiation. The probes used in liquid dispensing and measuring systems can act as an antenna with respect to such radiation, resulting in electronic noise in the systems that can adversely affect measured capacitance and can cause an incorrect detection of a liquid event.

SUMMARY OF INVENTION

At least one aspect of the invention is directed to a liquid level sensing system. The system includes a probe constructed and arranged to be moved relative to a liquid sample, a signal source coupled to the probe to apply an applied signal to the probe, at least one detector coupled to the probe to detect at least one detected signal, the detected signal being related to the applied signal and having a rising edge and a falling edge, and a controller coupled to the detector and configured to detect presence of a noise signal based on at least one of the rising edge and the falling edge of the detected signal.

In the liquid level sensing system, the controller may be configured to detect contact of the probe with a liquid. The system may further include a motion controller for controlling motion of the probe, wherein the controller may be configured to provide a stop signal to the motion controller upon detection of the presence of the noise signal, and wherein the motion controller may be configured to pause motion of the probe in response to receipt of the stop signal. The signal source may include a constant current source. In the system, at least one of the controller and the detector may be configured to determine a rise time associated with the rising edge of the detected signal and a fall time associated with the falling edge of the detected signal. The controller may be configured to detect contact of the probe with a liquid based on a change in at least one of the rise time and the fall time. The controller may be configured to detect the presence of the noise signal based on a difference between the rise time and the fall time of the detected signal. The probe may include at least one of a dispensing device configured to dispense liquid and an aspiration device configured to aspirate liquid from a container.

Another aspect of the invention is directed to a method of detecting a liquid level using a probe. The method includes applying an electrical signal to the probe, detecting a rising edge and a falling edge of the electrical signal, and detecting presence of a noise signal based on at least one of the rising edge and the falling edge of the electrical signal.

The method may further include detecting contact of the probe with a liquid. The method may include moving the probe toward the liquid and pausing motion of the probe in response to detection of the noise signal. In the method, applying an electrical signal may include applying a square wave electrical signal having a constant current. The method may further include determining a rise time associated with the rising edge of the electrical signal and determining a fall time associated with the falling edge of the electrical signal. The method may include detecting contact of the probe with a liquid based on a change in at least one of the rise time and the fall time. In the method, the controller may be configured to detect the noise signal based on a difference between the rise time and the fall time of the detected signal.

Another aspect of the invention is directed to a liquid level sensing system. The system includes a probe constructed and arranged to be moved relative to a liquid sample, a signal source coupled to the probe to apply an applied signal to the probe, and means for detecting presence of a noise signal based on at least one of the rising edge and the falling edge of a detected signal associated with the probe.

The system may further include means for detecting contact of the probe with a liquid. The system may further include means for controlling motion of the probe, and for pausing motion of the probe in response to detection of a noise signal. The signal source may further include a constant current source. The system may include means for determining a rise time associated with the rising edge of the detected signal and a fall time associated with the falling edge of the detected signal. The system may include means for detecting contact of the probe with a liquid based on a change in at least one of the rise time and the fall time. The probe may include at least one of a dispensing device configured to dispense liquid and an aspiration device configured to aspirate liquid from a container.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
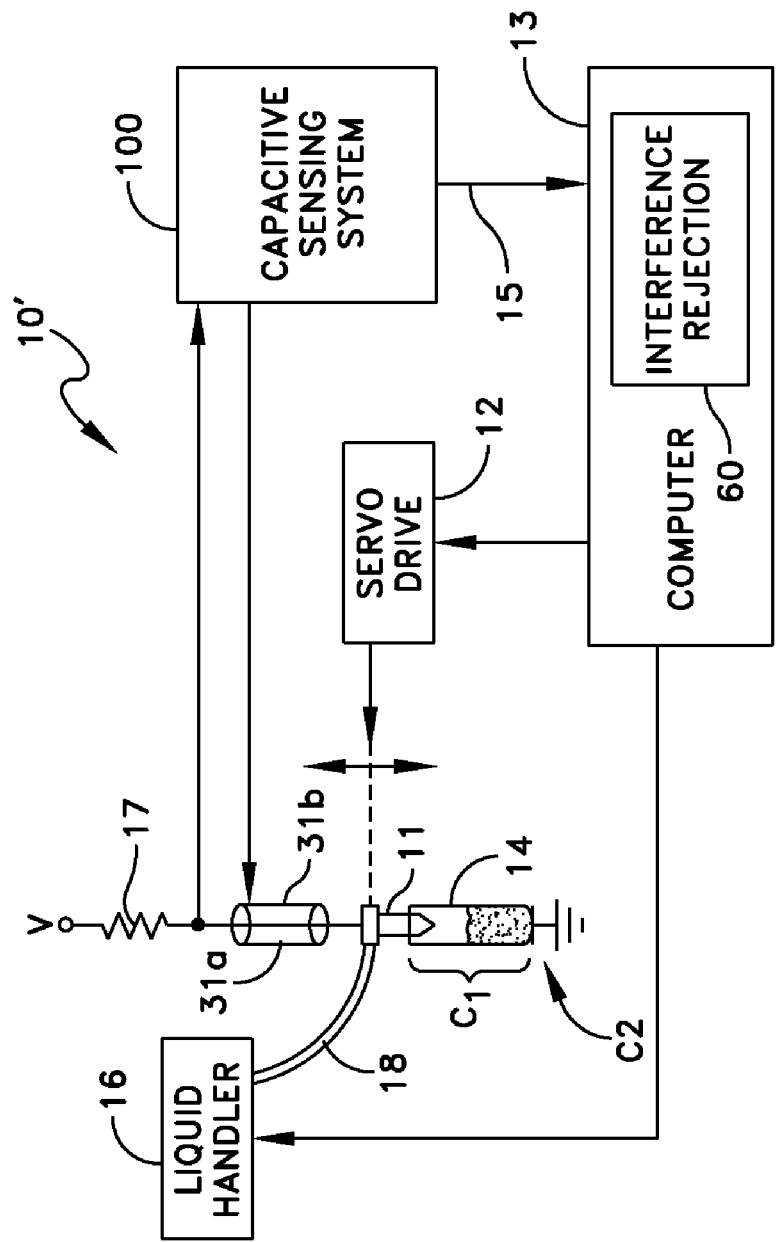
FIG. 1 is a functional block diagram of a liquid handling system.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Embodiments of the present invention are described herein primarily for use in liquid level dispensing systems; however, the techniques may also be used in other systems, where there is a desire to reduce the effects of noise in measurement systems or other electronic systems.

As discussed above, undesirable electronic noise may be introduced into liquid level sensor systems through static discharges and through the coupling of electromagnetic radiation to probes and other circuits contained in the systems. U.S. Pat. No. 7,191,647 (the '647 Patent), titled Method and Apparatus to Reject Electrical Interference in a Capacitive Liquid Level Sensor System, incorporated herein by reference, discloses systems and methods for detecting electronic noise and reducing the effects of the electronic noise in liquid level sensor systems. In the systems and methods disclosed in the '647 Patent, filtering systems are employed to reduce the effect of noise, and motion of the pipette towards the liquid is repeatedly paused upon detection of a possible liquid detection event to allow for a determination between an actual liquid detection event and a noise event.

FIG. 1, is a block diagram of a z-axis controlled automated liquid measuring system 10 of the '647 Patent. The system provides control over the position of a probe 11 with respect to an unknown level of liquid in a conventional laboratory container 14. Movement of the probe 11 in the z-axis into or out of the container 14 is controlled by a conventional servo-drive 12 which is controlled by a microcomputer or CPU 13. The CPU 13 determines the position of the probe 11 with respect to the level of the liquid in the container 14 by monitoring a signal 15 representing capacitance between: the probe 11 and the liquid in the container 14, the liquid in the container 14, and ground. The CPU may also be programmed to control a liquid handler 16 (e.g., syringe) which can aspirate or dispense a desired amount of fluid from or into the container 14 through the probe 11 via a flexible tube 18 made from a chemically inert material such as Teflon, for example.

The stray capacitance, depicted as $C_1$ between the probe 11 and the liquid in the container 14 slowly increases as the probe 11 is moved toward the liquid. When the probe contacts the liquid in the container 14, the stray capacitance, $C_1$ changes virtually instantaneously. A capacitive sensing system 100 is coupled, via a conductor 31a to detect changes in this stray capacitance, and provide corresponding sensor data to the CPU 13 in the form of signal 15 which is indicative of a capacitance between the probe 11, the liquid in the container 14, and ground.

The stray capacitance $C_1$ is monitored by the system 100 through a sampling operation that with each sample instant applies a voltage to the probe 11/container 14 (i.e., to the capacitance $C_1$) and measures the voltage charge on the capacitance $C_1$ to detect and latch a peak voltage developed on the capacitance $C_1$. This latched peak voltage is output as the signal 15 for application to the CPU 13. In at least one embodiment, the signal 15 is a digital signal representation of the sampled peak voltage value. When the probe 11 contacts the liquid in the container 14, a rapid change occurs in the stray capacitance which causes the measured voltage developed on the capacitance to decrease rapidly. This decreased voltage signal level is detectable in the output signal 15 and does not change for as long as the probe 11 remains in the liquid (assuming no evaporation/loss of liquid).

As an example, at the start of each sampling cycle, the voltage at probe 11 is initially held at 0 Volts via a closed switch (not shown) between ground and conductor 31a. Next, the switch is opened so that the illustrated voltage (e.g. 24V) is applied through an impedance 17 to the capacitance $C_1$. The impedance 17 and the capacitance $C_1$ form an RC time constant such that the voltage at the probe 11 increases at a rate proportional to the capacitance $C_1$. After a fixed time (e.g., approximately 10 microseconds), the peak voltage at probe 11 is measured by the system 100 via conductor 31a. This voltage measurement is indicative of capacitance $C_1$ and is sent to the computer 13 via signal 15. The switch is then closed, thus discharging the capacitance $C_1$ and resetting the voltage at probe 11 to 0 Volts. The foregoing cycle can be continuously repeated at a fixed frequency.

As the probe is moved toward (or away) from the liquid, the capacitance $C_1$ changes and thus the peak voltage charge storable on the capacitance $C_1$ at each sampling instant also changes. The storable peak voltage charge (provided in the signal 15) is monitored and when it changes (e.g., decreases) at a rate exceeding a rate expected for probe movement, this change provides an indication of the occurrence of an event such as a liquid level sense event when the probe 11 penetrates the meniscus of the fluid within the container. However, it is known that electromagnetic interference can cause momentary increases/decreases in the storable peak voltage charge where no meniscus penetration has occurred. In such situations, the rate of voltage change (e.g., decrease) which is detected by the capacitive sensing system could be processed by the computer 13 and incorrectly identified as a liquid level sense event (i.e., a false positive indication).

To help reduce noise effects, the computer 13 includes an interference rejection section 60 that includes filtering to reduce the effects of electromagnetic radiation, and includes instructions for implementing a measurement scheme that reduces the effects of static discharges. In the measurement scheme, upon detection of an event (a voltage step in signal 15), movement of the probe is paused, and multiple measurement samples are taken to determine whether the voltage step is indicative of a liquid event such as penetration of the liquid meniscus within the container, or is the result of interference or noise. For example, in the situation where the event is a static discharge event, pausing of probe 11 allows for the static interference to dissipate. If the event is determined to be a liquid event (because the subsequent multiple sample points show a voltage step), then the computer 13 may signal the liquid handler 16 to aspirate or dispense a desired amount of fluid from or into the container 14 through the probe 11.

If the event is determined to be noise (because the subsequent multiple sample points fail to show a voltage step), the event is identified as false, and the computer signals the servo drive 12 to resume probe 11 movement to search for the liquid level.

Embodiments of the present invention described herein provide improved systems and methods for identifying liquid level in the presence of noise. In particular, at least some embodiments use a phase based capacitive liquid level sensing system in which a change in phase between a waveform produced by an oscillator signal source and a measured pipette signal is used to detect capacitive changes and identify that the liquid level has been detected. Phase based capacitive sensing is described further in U.S. Pat. No. 3,391,547. In at least some embodiments of the present invention described further below, improved phase based systems and methods use information related to both a rising edge and a falling edge of a waveform produced by an oscillator to determine whether noise is present that may affect measurement levels. The rising edge may also be referred to as the leading edge, and the falling edge may also be referred to as the trailing edge.

Figure 2:
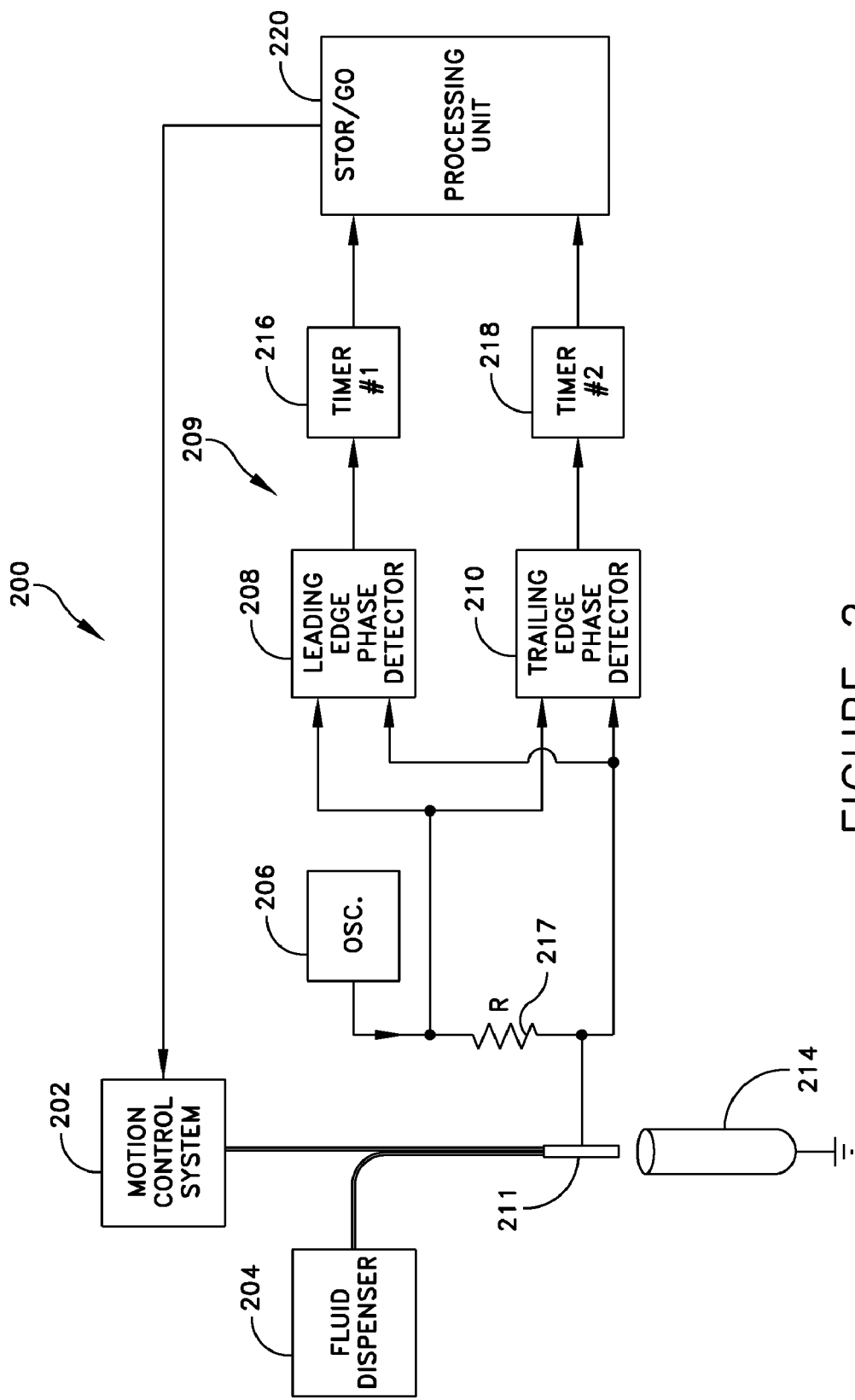
FIG. 2 is a functional block diagram of a liquid handling system in accordance with one embodiment of the present invention.

FIG. 2 is a block diagram of a z-axis controlled automated liquid measuring system 200 in accordance with one embodiment of the present invention. The system 200 includes a motion controller 202 and a fluid dispenser 204, both coupled to a pipette 211. The motion controller controls vertical motion of the pipette to lower the pipette towards a container 214. The fluid dispenser 204 controls dispensing of fluid from the pipette into the container 214. In other embodiments, the fluid dispenser may be replaced by a fluid aspirator that controls the pipette to draw liquid from the container 214.

Also coupled to the pipette is a liquid sensing system 209 that includes an oscillator 206, an impedance (e.g., resistor) 217, a leading edge detector 208, a trailing edge detector 210, a first timer 216, a second timer 218, and a processing unit 220. The oscillator is coupled to the pipette 211 through the resistor 217, and both the leading edge detector and the trailing edge detector are coupled across the resistor 217 and also coupled to the system ground to detect the oscillator signal from the oscillator and to detect the pipette signal at the pipette. The first timer 216 is coupled to the leading edge phase detector 208 and to the processing unit. The second timer 218 is coupled to the trailing edge detector 210 and the processing unit.

In one embodiment, the oscillator 206 may be implemented using a sinusoidal oscillator, and the impedance 217 may be implemented using an approximate 20 kohm to an approximate 100 kohm resistor. The leading edge phase detector 208, the trailing edge phase detector 210, and the timers 216 and 218 may be implemented using discrete circuits, ICs, ASICs and/or may be implemented in software in a central controller of the system 200 that also performs the functionality of the processing unit and may also perform at least some of the functionality of the motion controller.

In operation, the processing unit signals the motion controller to start downward movement of the pipette. In one embodiment, the pipette is moved at 50 to 100 millimeters per second. The oscillator may also be coupled to the processing unit, and receive a signal from the processing unit to start generating an output signal at about the same time that the motion controller starts moving the pipette. In one embodiment, the signal generated by the oscillator is a sine wave having a frequency of approximately 2 kHz to approximately 120 kHz and a voltage of approximately +5V to approximately −5V.

During movement of the pipette, the leading edge detector detects when the leading edge of the oscillator signal crosses a threshold (e.g. 0 volts) and provides a start signal to start the first timer. The leading edge detector then detects when the leading edge of the pipette waveform crosses the threshold and provides a stop signal to stop the first timer. The time between the timer starting and receiving a stop signal shall be referred to herein as the "on-time" of the timer. The first timer provides an output signal to the processing unit indicative of the time difference (and accordingly the phase difference) between detection of the leading edge of the oscillator signal and the pipette signal. As discussed above, the phase difference is indicative of the capacitance and is used by the processing unit to determine when the pipette has contacted the liquid sample. The trailing edge detector detects when the trailing edge of the oscillator signal crosses the threshold and provides a start signal to start the second timer. The trailing edge detector then detects when the trailing edge of the pipette waveform crosses the threshold and provides a stop signal to stop the second timer. The second timer provides an output signal to the processing unit indicative of the time difference (and accordingly the phase difference) between detection of the trailing edge of the oscillator signal and the trailing edge of the pipette signal.

Figure 3:
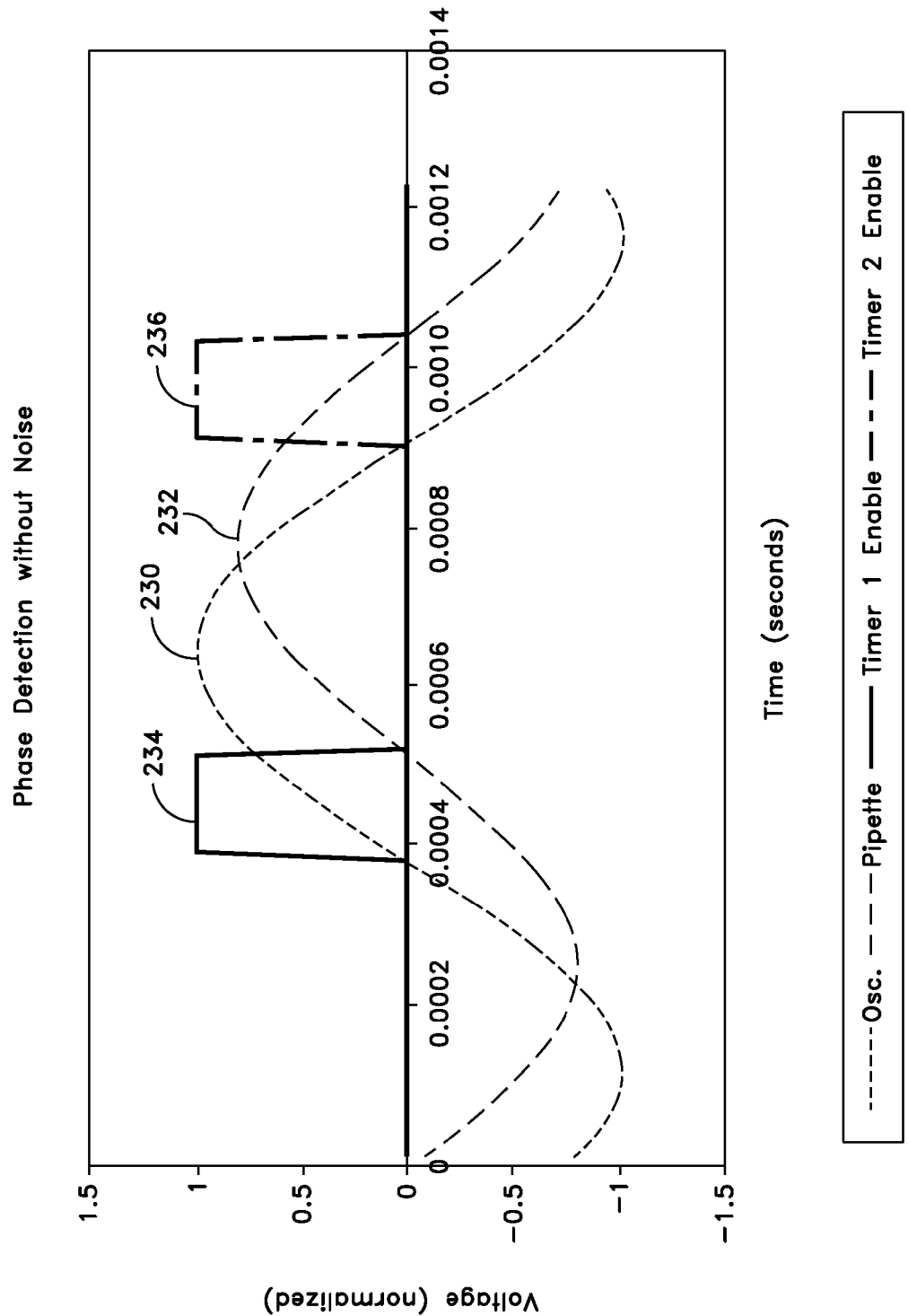
FIG. 3 is a graph showing plots of pipette waveforms.

FIG. 3 includes a graph showing the oscillator waveform/signal 230, the pipette waveform/signal 232, a first timer signal 234 and a second timer signal 236. The first timer signal 234 and the second timer signal 236 respectively show the on-time of the first timer and the on-time of the second timer. The on-time or duration of the first timer signal 234 is representative of the phase difference between the leading edges of the oscillator signal and the pipette signal at the leading edge. The on-time 236 of the second timer signal is representative of the phase difference between the trailing edges of the oscillator signal 230 and the pipette signal 232. In a noise free environment, the on-time or duration of the first timer signal 234 is approximately equal to the on-time or duration of the second timer signal 236, as shown in FIG. 3.

Figure 4:
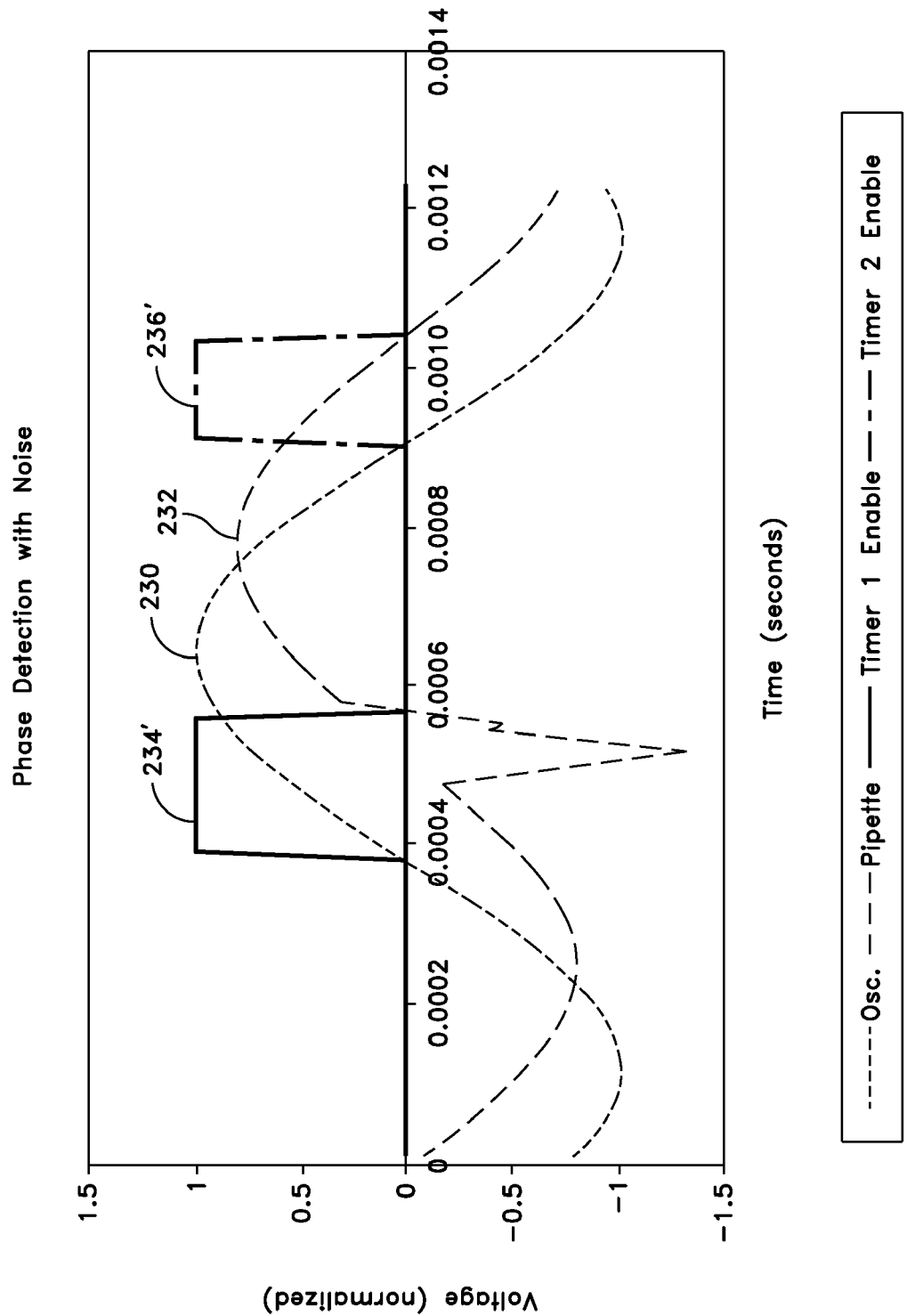
FIG. 4 is a graph showing plots of pipette waveforms in the presence of noise.

FIG. 4 includes a graph that is similar to that shown in FIG. 3 and the waveforms in FIG. 4 have the same reference numbers as those of FIG. 3, except that in FIG. 4, the reference numbers for the first and second timer signals are respectively 234' and 236'. FIG. 4 differs from FIG. 3 in that a noise event occurs during the movement of the pipette during the time period shown in FIG. 4. The noise event causes the leading edge of the pipette waveform to cross the zero voltage axis after a delay caused by the noise event, and during this noise event, the on-times or durations of the first and second timer signals are not substantially equal (i.e., the phase differences at the leading and trailing edges are not substantially the same). In determining whether the on-times or durations are substantially equal, a difference value threshold may be used, such that the on-times or durations are not considered equal if a difference between them is greater than the difference value threshold. The particular difference value threshold chosen may be based on specific system parameters and may be adjustable in some embodiments.

With continued reference to FIG. 2, the processing unit 220 compares the signals from the timers 216 and 218. If the on-time or durations of the timer signals are approximately equal, indicating that noise has not been detected, then the processing unit 220 will control the motion control system to continue moving the pipette towards the liquid level. If the processing unit 220 determines that the on-times of the first and second timer signals differ, for example, by more than a specified or predetermined threshold (which may be based, at least in part, on the oscillator speed and timer resolution), the processing unit 220 shall determine that noise has been detected, and control the motion control system 202 to pause the movement of the pipette towards the liquid level. While the pipette is paused, the illustrated processing unit 220 continues to evaluate the timer signals until either the noise dissipates and the duration of the timer signals are substantially equal or a predetermined time interval/threshold since pausing the probe (e.g., three seconds, and such time interval can vary based on the particular embodiment) has been exceeded. If the noise dissipates and the duration of the timer signals are substantially equal (e.g., difference does not exceed the difference threshold), then the processing unit 220 will instruct the motion control system 202 to continue moving the pipette 211 towards the liquid level. Alternatively, if the pipette 211 is paused for greater than the predetermined time without dissipation of the noise etc., then the illustrated processing unit 220 will provide a notification that the noise environment is too high for proper operation of the system.

When the pipette 211 touches the sample liquid, and no noise is present, then both the first and second timer signals/values will increase due to the increased capacitance imparted on the pipette. The amount of increase is variable based on the amount and conductivity of the liquid, the oscillator frequency, and the timer resolution. The processing unit 220 will then stop the movement of the pipette 211, and the dispensing/aspirating system 204 can perform an action such as dispensing material into the container or aspirating material from the container.

Figure 5:
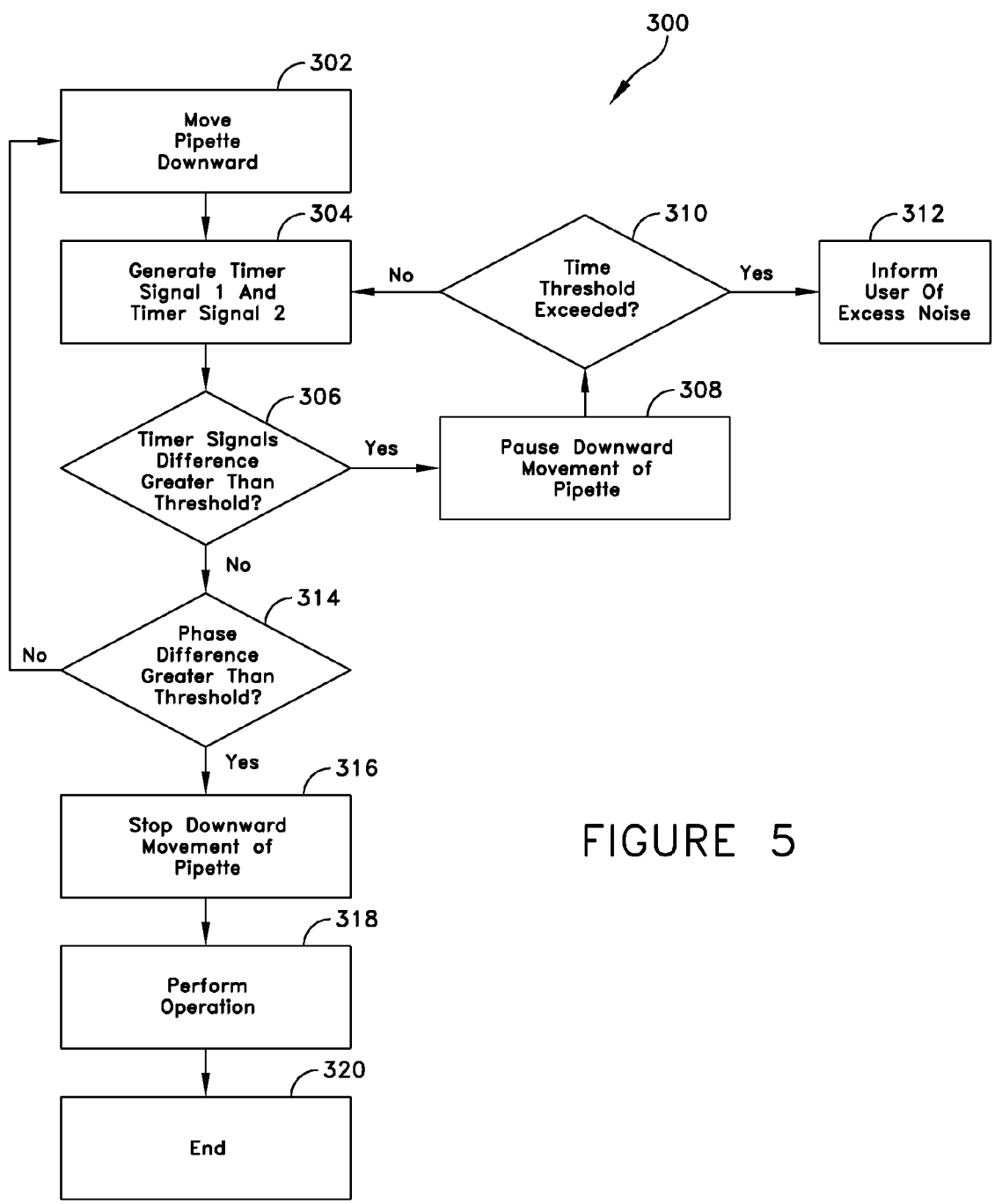
FIG. 5 is a flow chart of a method performed in a liquid handling system in accordance with one embodiment of the present invention.

The operation of the system 200 is summarized in flow chart form in FIG. 5, which illustrates a process 300 used in one embodiment for controlling the system 200. In a first stage 302 of the process 300, the processing unit controls the motion controller to start downward (e.g., z-axis) movement of the pipette. During the downward movement, of the pipette, the first and second timer signals are generated at stage 304. The processing unit compares the timer signals at stage 306 to determine if noise is present. If noise is present, then at stage 308, the downward movement of the pipette is paused. The movement of the pipette is paused until either the predetermined time interval/threshold is exceeded at stage 310, or until the differences between the duration of the timer signals are approximately equal (e.g., within the difference threshold) at stage 306. If the predetermined time threshold is exceeded at stage 310, then at stage 312, a notification of excess noise is provided.

If the noise is dissipated (or not present initially), then the process 300 moves to stage 314, where the processing unit determines if the phase difference/duration of the first timer signal is greater than a predetermined phase difference/threshold indicating that the capacitance at the pipette tip has increased and the pipette has contacted the liquid. If the phase difference/duration of the first timer signal does not exceed the predetermined phase value/threshold, then at stage 316, the downward movement of the pipette is stopped, and at stage 318, the pipette performs the intended operation (e.g., dispense, aspirate, etc.). The embodiment of this process then ends at stage 320.

Those of ordinary skill in the art will understand that although the FIG. 2 embodiment employed the use of timers to measure the phase difference between the oscillator and the pipette signals at the leading and trailing edges thereof, other well known and established techniques for measuring phase differences can be used.

Figure 6:
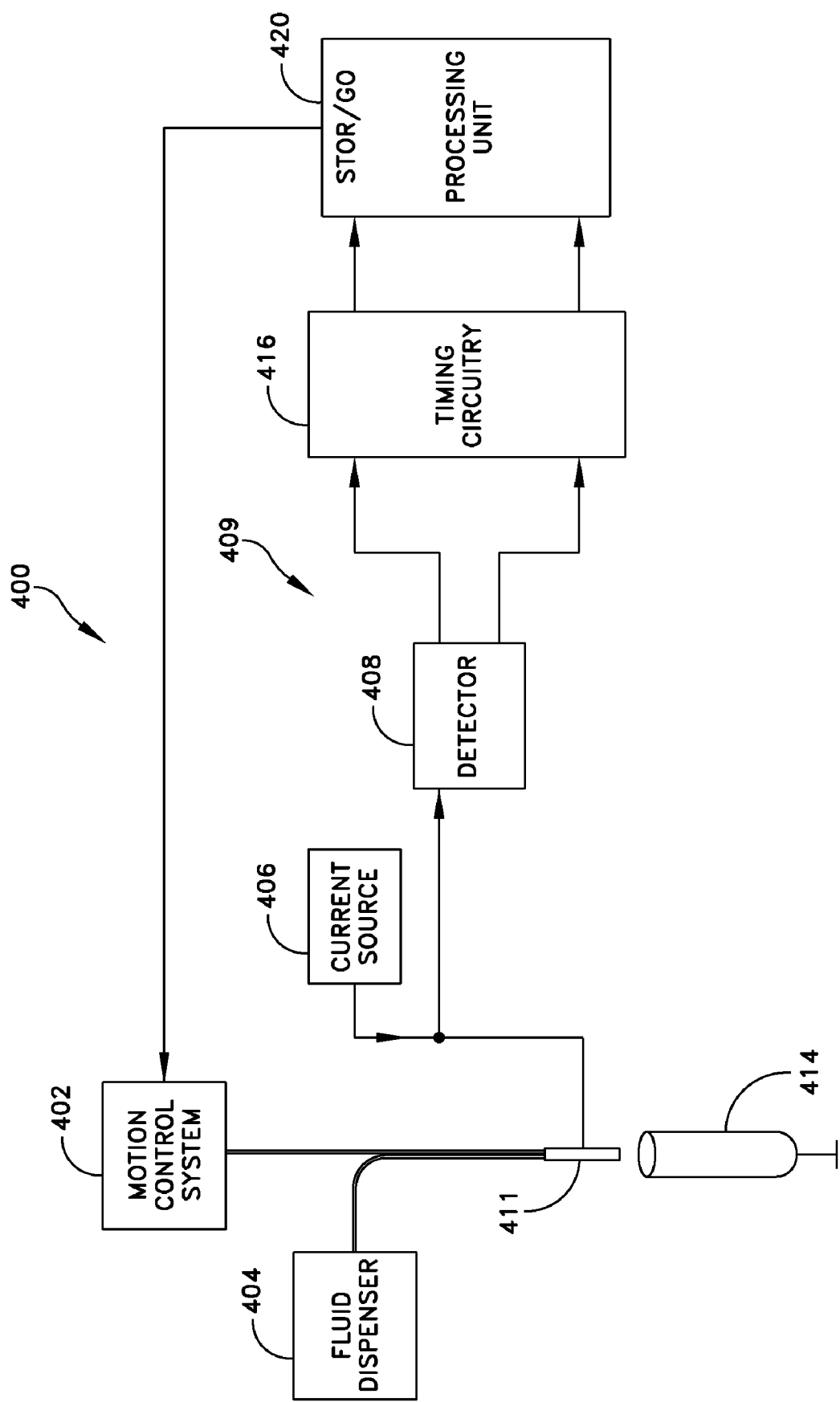
FIG. 6 is functional block diagram of a liquid handling system in accordance with one embodiment of the present invention.

A block diagram of another embodiment of a z-axis controlled automated liquid measuring system 400 is shown in FIG. 6. The system 400 includes a motion controller 402 and a fluid dispenser 404, both coupled to a pipette 411. As in the system 200, the motion controller 402 controls vertical motion of the pipette to lower the pipette 411 towards a container 414. The fluid dispenser 404 controls dispensing of fluid from the pipette into the container 414. In other embodiments, the fluid dispenser 404 may be replaced by a fluid aspirator that controls the pipette 411 to draw liquid from the container 414.

A liquid sensing system 409 is also coupled to the pipette and includes a constant current source 406, a detector 408, timing circuitry 416, and a processing unit 420. The constant current source 406 is coupled to the pipette 411 and the detector 408 is coupled to the pipette 411 and to the processing unit 420 through the timing circuitry 416. The constant current source 406 is configured to drive the pipette 411 with a square wave having a constant peak current. In one embodiment, the current is approximately equal to 50 microamperes and the frequency of the square wave is equal to approximately 2 kHz. The detector 408 is configured to determine the rise time and fall time of each pulse of the square wave, and to provide the rise time and the fall time to the processing unit 420. When the capacitance of the pipette changes, the slopes of the rising and falling edges of the square wave incident at the pipette also change. In one embodiment, the rise time determined by the detector is a 10% to 90% rise time (or 90% to 10% fall time); however, in other embodiments, other rise times and fall time values may be used.

In at least one embodiment that uses a constant current source, changes in the slopes of the rising and falling edges of the square wave are linearly proportional to changes in capacitance at the pipette. An abrupt change in the rise and fall times from one cycle to the next provides an indication of an abrupt change in capacitance, indicating that the pipette 411 has contacted the liquid. In the FIG. 6 system 400, when noise is not affecting the system, the rise and fall times will be substantially equal. In the operation of the FIG. 6 system 400, differences in rise and fall times can be used to detect the presence of noise, and to control the system to diminish the effects of the noise.

Figure 7:
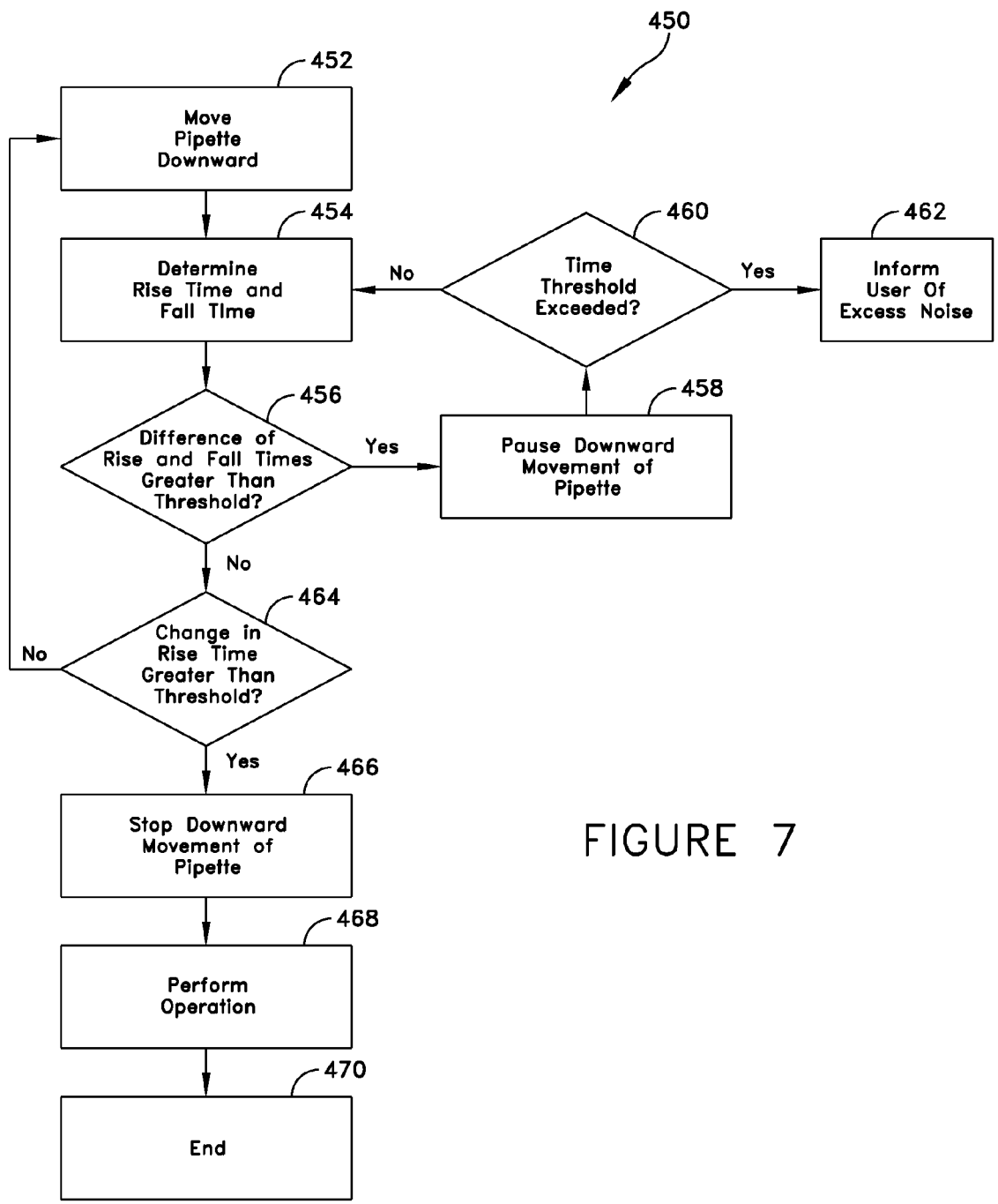
FIG. 7 is a flow chart of a method performed in a liquid handling system in accordance with one embodiment of the present invention.

The operation of the FIG. 6 system 400 is summarized in flow chart form in FIG. 7, which illustrates a process 450 used in one embodiment for controlling the system 400. In a first stage 452 of the process 450, the processing unit controls the motion controller to start downward movement of the pipette. During the downward movement of the pipette, the rise and fall times are detected and provided to the processing unit at stage 454. The processing unit 420 compares the rise time and fall time at stage 456 to determine if noise is present (e.g., determines if the difference is greater than a predetermined threshold). If noise is present, then at stage 458, the downward movement of the pipette is paused. The movement of the pipette is paused until either a predetermined time interval/threshold is exceeded at stage 460, or until the rise and fall times are approximately equal at stage 456. If the predetermined time threshold is exceeded at stage 460, then at stage 462, the user is notified.

If the noise is dissipated (or not present initially), then the process 450 moves to stage 464, where the processing unit determines if the rise time (or fall time) has changed more than a predetermined or specified threshold indicating, that the capacitance has increased and the pipette has contacted the liquid. If the outcome of stage 464 is "NO", then the process returns to stage 452, where the processing unit will either continue the movement of the pipette or restart the movement of the pipette. If the outcome of stage 464 is "YES," then at stage 466, the downward movement of the pipette is stopped, and at stage 468, the pipette performs the intended operation. The process then ends at stage 470. In embodiments described above, rise and fall times of signals are measured. The rise time may be defined as a 10% to 90% rise time (with fall time 90% to 10%) or the rise time and fall time may be defined in some other manner.

Figure 8:
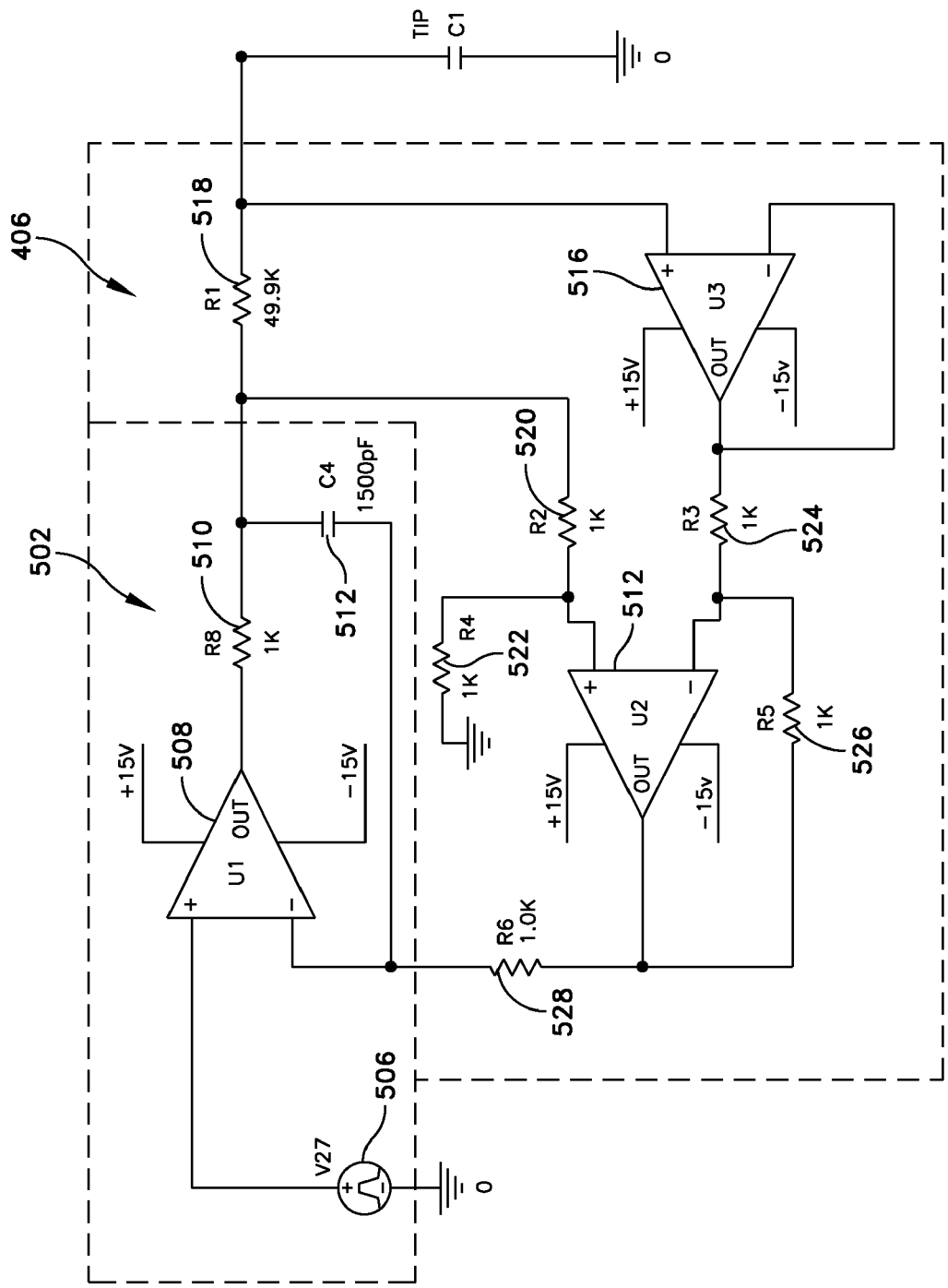
FIG. 8 is a schematic diagram of a signal source used in one embodiment of the present invention.

As discussed above, the system 400 includes a constant current source 406 that provides a square wave output having a constant peak current to the pipette. In one embodiment, the constant current source is a high impedance constant current source providing a square wave output with a frequency of approximately 2 kHz and a peak current of approximately 50 microamperes. The constant current source 406 used in one embodiment will now be described further with reference to FIG. 8, which shows a schematic diagram of the constant current source coupled to the tip of the pipette. In FIG. 8, capacitor C1 represents the capacitance between the tip of the pipette and the grounded container. As shown in FIG. 8, the illustrated current source includes two functional sections including a generator section 502, and a feedback section 504. The generator section is configured to produce a square wave output having a constant peak current. The output square wave is applied to the tip. The feedback section detects the current at the output of the generator section and provides feedback signals to the generator section to control the generator section such that the output current is maintained constant as the pipette is lowered toward the container and the value of the capacitance C1 changes.

The generator section includes a square wave generator 506, an operational amplifier 508, a resistor 510, and a capacitor 512. The square wave generator provides a square wave output to the operational amplifier 508. The operational amplifier receives the square wave signal as well as a feedback signal from the feedback section and provides the constant current square wave output. Capacitor 512 is used to stabilize the output of the operational amplifier 508.

The feedback section includes operational amplifiers 514 and 516, feedback resistor 518, and resistors 520, 522, 524, 526, and 528. The operational amplifiers detect the output current by sensing the voltage across the feedback resistor 518, and provide the feedback signal to the generator section. Resistors 510, 520, 522, 524, 526 and 528 are used to control signal levels to and from the operational amplifiers.

In one embodiment, the square wave generator is implemented using a 2 kHz clock output from a digital processing unit with the output voltage scaled using an amplifier, and each of the operational amplifiers are implemented using devices available from Analog Devices, Inc., part no. AD825/AD. In other embodiments, other devices may be used to provide the functionality of the generator section and the feedback section.

Figure 9:
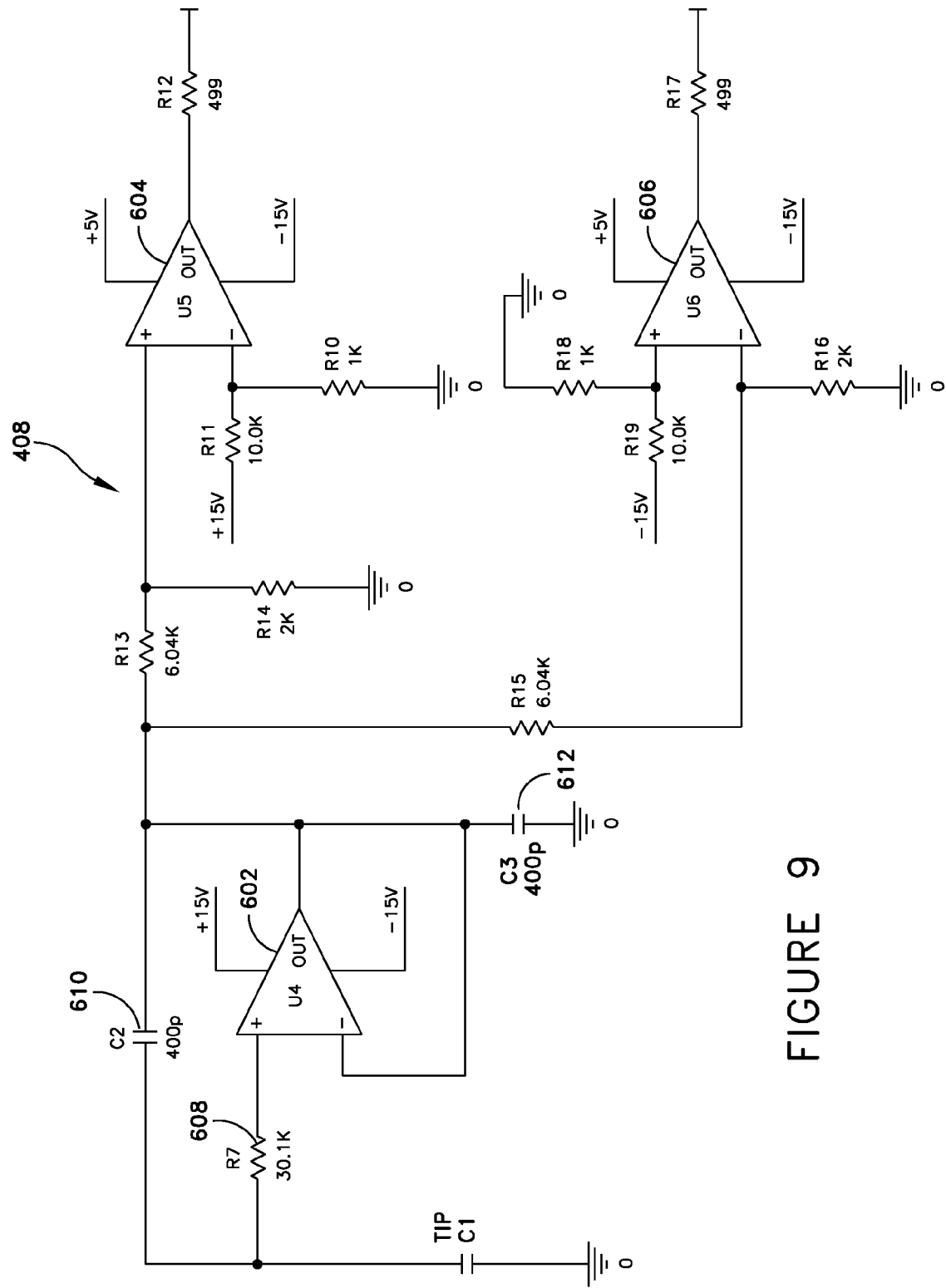
FIG. 9 is a schematic diagram of a detector used in one embodiment of the present invention.

The detector 408 used in one embodiment will now be described further with reference to FIG. 9, which shows a schematic diagram of the detector. The detector is coupled to the tip of the pipette as discussed above and detects the rising and falling edges of the current waveform applied to the pipette. The detector includes three operational amplifiers 602, 604, and 606. Operational amplifier 602 is coupled through a resistor 608 to the tip of the pipette. The operational amplifier 602 detects the voltage at the tip of the pipette, acts as buffer and provides an output signal related to the voltage at its input. Operational amplifiers 604 and 606 function as comparators and compare the output signal from operational amplifier 602 with positive and negative voltage threshold levels. The timer receives the outputs of the comparators and based on the outputs of the comparators can determine the fall and rise time of the waveform for each cycle.

In the detector shown, a number of resistors are used to provide appropriate voltage levels for the operational amplifiers. In one embodiment, each of the operational amplifiers are implemented using devices available from Analog Devices, Inc., part no. AD825/AD. In the detector of FIG. 9, two capacitors 610 and 612 are shown. In one embodiment, a coaxial cable is used to couple the detector to the tip of the pipette. The coaxial cable is coupled to a small circuit board in the pipette holder, and the pipette holder is coupled to the pipette using pogo pins. Capacitor 610 represents the capacitance in the coaxial cable between the center conductor and the shield, and capacitor 612 represents the capacitance between the shield and ground.

In embodiments described above, the illustrated detector circuitry, timers, processing units and control system may be implemented using a variety of well known circuitry, for example, analog circuitry, digital circuitry, hardware, software, field programmable gate arrays (FPGA) or combinations of two or more of these. Further, in certain embodiments, the processing unit, motion controller, and other functional modules may be implemented in one or more computer systems, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC). Accordingly, one of ordinary skill will understand that although the illustrated embodiments (e.g., FIG. 2 and 6) show multiple components for the timers, detectors, processing units, and motion controllers, such system components were presented individually for illustration and explanation purposes, and certain embodiments may thus actually implement such attributable features in one or more components, which may collectively be referred to as a controller, system controller or control system.

The computer system used in at least one embodiment can include one or more processors typically connected to one or more memory devices, which can comprise, for example, any one or more of a disk drive memory, a flash memory device, a RAM memory device, or other device for storing data. The memory is typically used for storing programs and data during operation of systems of embodiments of the invention. For example, the memory may be used for storing historical data relating to operational parameters over a period of time, as well as operating data. Software, including programming code that implements embodiments of the invention, can be stored on a computer readable and/or writeable nonvolatile recording medium, and then typically copied into the memory wherein it can then be executed by the processor. Such programming code may be written in any of a plurality of programming languages, for example, Java, Visual Basic, C, C#, or C++, Fortran, Pascal, Eiffel, Basic, COBAL, or any of a variety of combinations thereof.

Components of the computer system may be coupled by one or more interconnection mechanisms, which may include one or more busses (e.g., between components that are integrated within a same device) and/or a network (e.g., between components that reside on separate discrete devices). The interconnection mechanism typically enables communications (e.g., data, instructions) to be exchanged between components of the computer system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network (in addition or as an alternative to the network that may be formed by one or more of the components of the computer system).

The computer system can include one or more computer storage media such as readable and/or writeable nonvolatile recording medium in which signals can be stored that define a program to be executed by one or more processors. The medium may, for example, be a disk or flash memory. In typical operation, the processor can cause data, such as code that implements one or more embodiments of the invention, to be read from the storage medium into a memory that allows for faster access to the information by the one or more processors than does the medium. The memory is typically a volatile, random access memory such as a dynamic random access memory (DRAM) or static memory (SRAM) or other suitable devices that facilitates information transfer to and from the processor.

It should be appreciated that the invention is not limited to being implemented in software, or on the computer system as exemplarily discussed herein. Indeed, rather than implemented on, for example, a general purpose computer system, a controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by the controller can be performed in separate computers, which in turn, can be in communication through one or more networks.

In embodiments discussed above, systems and methods are described for detecting a liquid level in dispensing and aspirating systems. As understood by those skilled in the art, systems and methods described herein can be used in dispensing and aspirating systems having one container or having multiple liquid containers. Further, systems and methods described herein may be used with a variety of liquids including conductive and non-conductive liquids.

In embodiments described above, liquid level handling systems include a nozzle that functions as a probe and functions as a dispensing device or aspiration device. In other embodiments, a probe, separate from a dispensing device or aspiration device, may be used to determine a liquid level. The liquid level may then be stored in the controller, and used to properly position a dispensing device or aspiration device relative to the liquid level.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A liquid level sensing system comprising:
   a probe constructed and arranged to be moved relative to a liquid sample;
   a signal source coupled to the probe to apply an applied signal to the probe;
   at least one detector coupled to the probe to detect at least one detected signal, the detected signal being related to the applied signal and having a rising edge and a falling edge; and
   a controller coupled to the detector and configured to detect presence of a noise signal based at least in part on the rising edge and the falling edge of the detected signal.

2. The liquid level sensing system of claim 1, wherein the controller is further configured to detect contact of the probe with a liquid.

3. The liquid level sensing system of claim 2, further comprising a motion controller for controlling motion of the probe, wherein the controller is configured to provide a stop signal to the motion controller upon detection of the presence of the noise signal, and wherein the motion controller is configured to pause motion of the probe in response to receipt of the stop signal.

4. The liquid level sensing system of claim 3, wherein the signal source includes a constant current source.

5. The liquid level sensing system of claim 1, wherein at least one of the controller and the at least one detector is configured to determine a rise time associated with the rising edge of the detected signal and a fall time associated with the falling edge of the detected signal.

6. The liquid level sensing system of claim 5, wherein the controller is configured to detect contact of the probe with a liquid based on a change in at least one of the rise time and the fall time.

7. The liquid level sensing system of claim 6, wherein the controller is configured to detect the presence of the noise signal based on a difference between the rise time and the fall time of the detected signal.

8. The liquid level sensing system of claim 3, wherein at least one of the at least one detector and the controller is configured to determine a phase difference between the applied signal and the detected signal at both the rising edge and the falling edge of the detected signal.

9. The liquid level sensing system of claim 5, wherein the controller is configured to detect contact of the probe with a liquid based on a change in at least one of the rise time and the fall time.

10. A method of detecting a liquid level using a probe comprising:

applying an electrical signal to the probe;
detecting a rising edge and a falling edge of the electrical signal; and
detecting presence of a noise signal based on at least one of the rising edge and the falling edge of the electrical signal.

11. The method of claim 10, further comprising detecting contact of the probe with a liquid.

12. The method of claim 11, further comprising moving the probe toward the liquid and pausing motion of the probe in response to detection of the noise signal.

13. The method of claim 12, wherein applying an electrical signal includes applying a square wave electrical signal having a constant current.

14. The method of claim 11, further comprising determining a rise time associated with the rising edge of the electrical signal and determining a fall time associated with the falling edge of the electrical signal.

15. The method of claim 14, further comprising detecting contact of the probe with a liquid based on a change in at least one of the rise time and the fall time.

16. The method of claim 15, wherein the controller is configured to detect the noise signal based on a difference between the rise time and the fall time of the detected signal.

17. The method of claim 12, further comprising determining a phase difference between an applied signal and a detected signal at both a rising edge and a falling edge of the detected signal.

18. The method of claim 12, further comprising dispensing liquid from the probe into a container.

19. A liquid level sensing system comprising:
a probe constructed and arranged to be moved relative to a liquid sample;
a signal source coupled to the probe to apply an applied signal to the probe;
means for detecting presence of a noise signal based on the rising edge and the falling edge of a detected signal associated with the probe.

20. The liquid level sensing system of claim 19, further comprising means for detecting contact of the probe with a liquid.

21. The liquid level sensing system of claim 20, further comprising means for controlling motion of the probe, and for pausing motion of the probe in response to detection of a noise signal.

22. The liquid level sensing system of claim 21, wherein the signal source includes a constant current source.

23. The liquid level sensing system of claim 19, further comprising means for determining a rise time associated with the rising edge of the detected signal and a fall time associated with the falling edge of the detected signal.

24. The liquid level sensing system of claim 23, further comprising means for detecting contact of the probe with a liquid based on a change in at least one of the rise time and the fall time.

25. The liquid level sensing system of claim 21, further comprising means for determining a phase difference between the applied signal and the detected signal at both the rising edge and the falling edge of the detected signal.

* * * * *